Patented Feb. 16, 1932

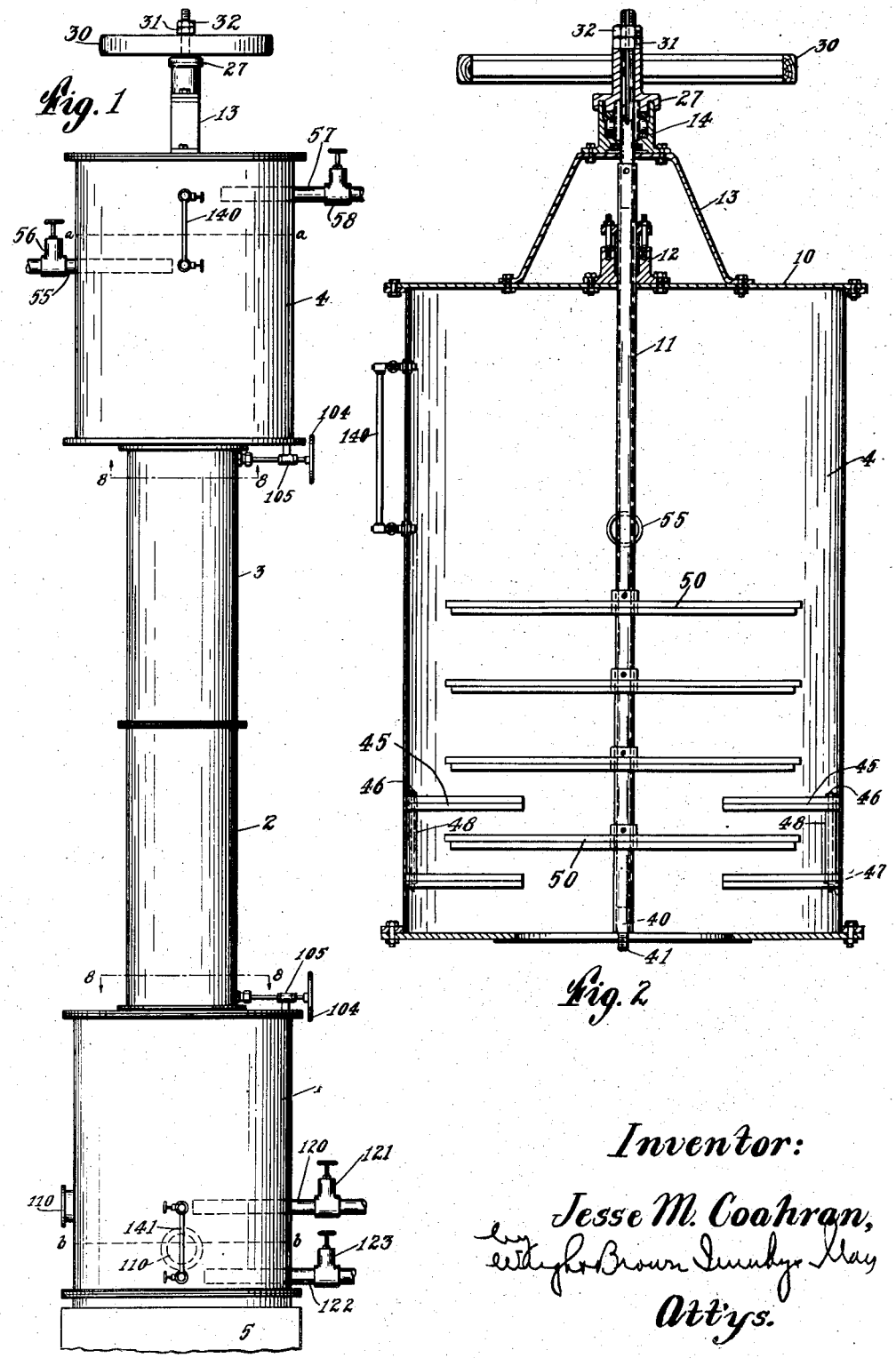

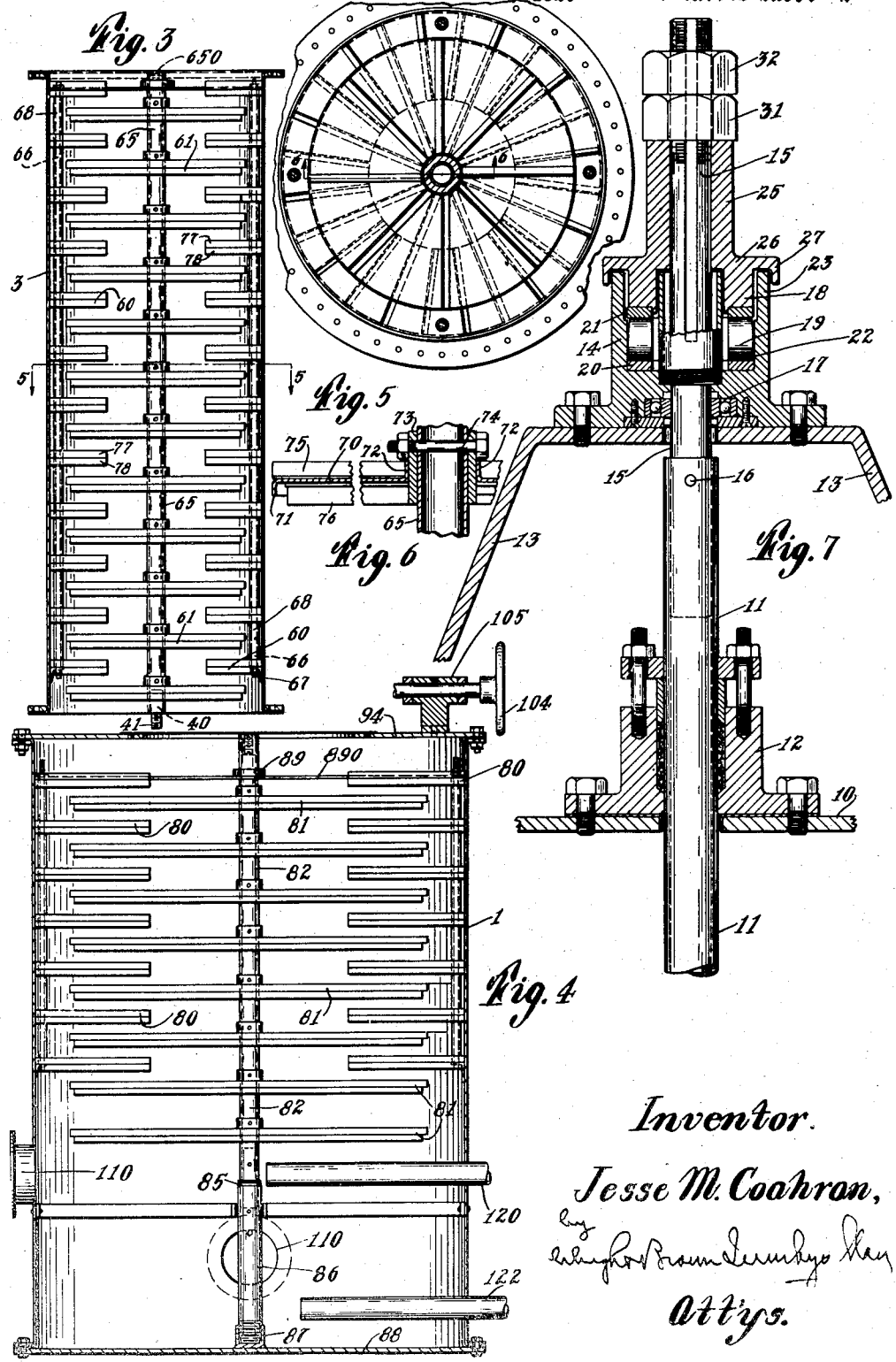

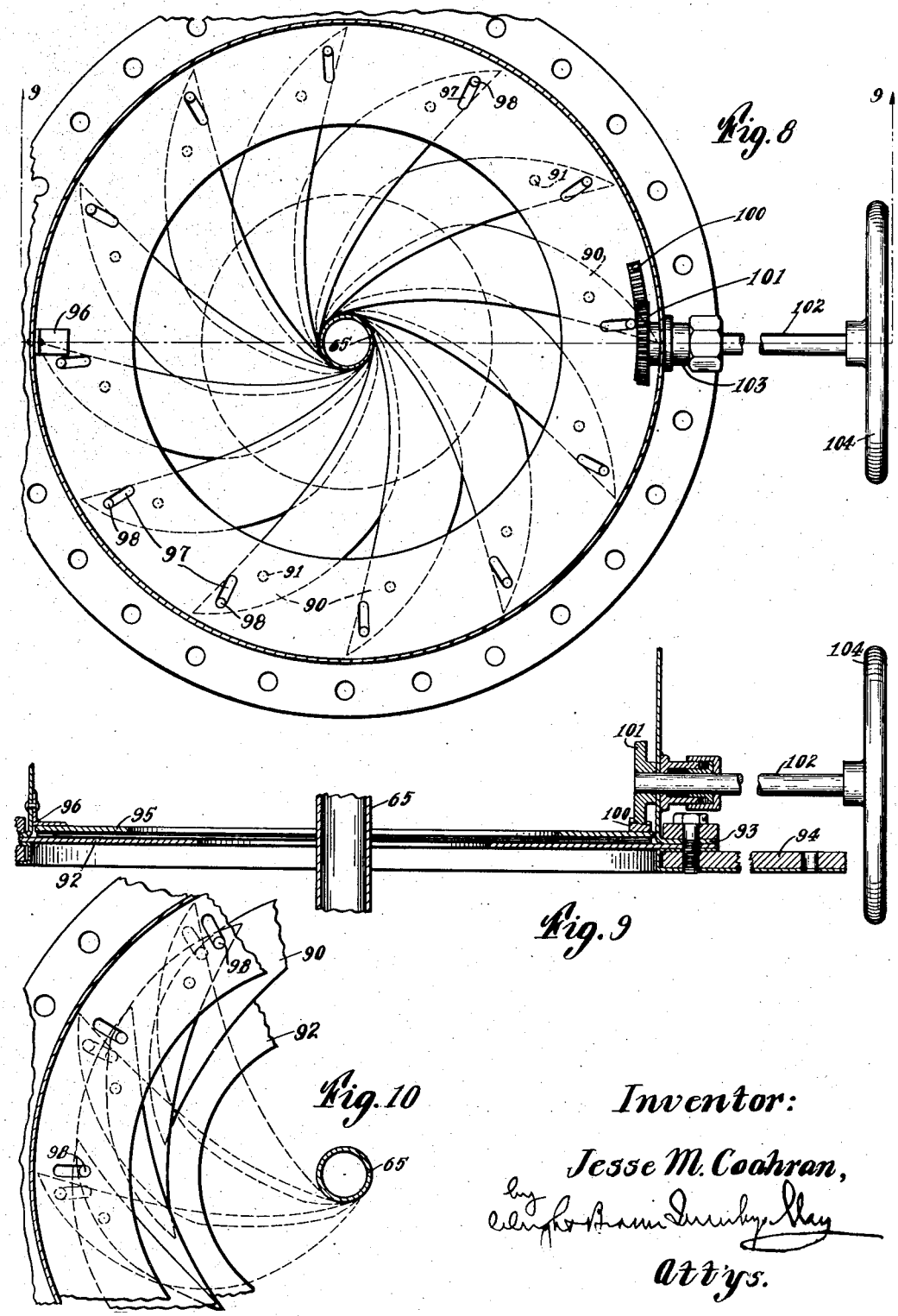

1,845,128

UNITED STATES PATENT OFFICE

JESSE M. COAHRAN, OF COLEGROVE, PENNSYLVANIA

APPARATUS FOR EXTRACTING CHEMICALS FROM LIQUORS

Application filed January 21, 1925. Serial No. 3,797.

This invention relates to the extraction of chemicals from liquors containing them through the use of solvents for the chemicals immiscible with the liquors and of different specific gravities. The solvent is brought into intimate contact with the liquor containing the chemicals, whereby the liquor yields a portion of the chemicals to the solvent which is then removed and the chemicals recovered therefrom. In order that the largest possible proportion of chemicals shall be removed from the liquor it is evident that a relatively small quantity of liquor should be treated with a relatively large quantity of solvent, and also that for the most efficient extraction, liquor from which the chemicals have been more nearly removed should be treated with the fresher solvent. The use of a relatively large amount of solvent for the total amount of liquor treated, and consequently for the amount of chemicals recovered, would, however, result in a large amount of solvent solution weak in chemicals from which the chemicals would be recovered. This would greatly increase the difficulties and the cost of such recovery due to the great volume of material handled in proportion to the amount of chemicals recovered. For the most efficient recovery, therefore, it is desirable that the chemicals should be highly concentrated in the solvent. To effect this, it is clear that a relatively small amount of solvent must be used to treat a relatively large amount of liquor and that the solvent more nearly saturated with the chemicals should be brought into contact with only the most highly saturated liquor.

The treatment of the nearly exhausted liquor with the fresh solvent and the fresh liquor with the more nearly saturated solvent may be readily effected by establishing flow of the liquor and solvent in opposite direction while in contact with each other and the difference in specific gravities of the liquor and solvent may be utilized to effect such counter flow of the two fluids.

The treatment of a relatively small amount of liquor with a relatively large amount of solvent for most efficient extraction, and the treatment of a relatively small amount of solvent with a relatively large amount of liquor for the easiest recovery of chemicals from the solvent, however, present opposed conditions, and as heretofore practiced this general method of recovery of chemicals has been carried out as a compromise, balancing the wastage of chemicals through incomplete extraction against the saving effected by recovery from the more highly saturated solvents.

According to the present invention, however, both of these apparently inconsistent conditions are utilized in the one apparatus, and in a continuous counter flow process, a relatively large volume of the solvent contacting with a relatively small volume of nearly extracted liquor, and the major portion of the extraction being affected with a large proportion of solvent to liquor so that the extraction may be highly efficient, and the more nearly saturated solvent being thereafter brought into intimate contact with a relatively large volume of fresh liquor in order that the concentration in the solvent at the end of the treatment shall be high, thus requiring the minimum amount of treatment for recovery of the chemicals from the solvent.

In order to carry out the process as thus described, this invention also comprehends an apparatus particularly designed therefor. For the most efficient extraction it is important that the solvent and liquor be brought into intimate contact and it is therefore usually desirable to provide mechanical agitating means for thoroughly mixing the solvent and liquor. Certain features of this invention therefore reside in means by which such agitation may be effected. Certain other features of the invention relate to the control of flow of solvent and liquor through the apparatus.

For a more complete understanding of this invention, together with further features and advantageous details and combinations of parts, reference may be had to the accompanying drawings in which one embodiment of an apparatus capable of carrying out the improved process is set forth. It should be evident, however, that the process might be carried out in other apparatus differing in many respects from that illustrated.

Referring to the accompanying drawings:

Figure 1 is a side elevation of the extractor.

Figure 2 is a vertical cross section through an upper section thereof.

Figure 3 is a vertical cross section through one of the intermediate sections.

Figure 4 is a vertical cross section through the lowest section.

Figure 5 is a horizontal cross section on line 5—5 of Figure 3.

Figure 6 is a detail section on line 6—6 of Figure 5.

Figure 7 is a detail section to an enlarged scale of the upper shaft bearing and related parts.

Figure 8 is a section on either of the lines 8—8 of Figure 1.

Figure 9 is a section on line 9—9 of Figure 8.

Figure 10 is a fragmentary view similar to a portion of Figure 8, but showing the parts in different positions.

Referring to Figure 1, it will be seen that the extractor comprises a plurality of superposed sections forming together a column in which the solvent and the liquor are brought into intimate contact while flowing in opposite directions. As shown, this column comprises four sections although more or less might be employed to suit the particular conditions in any given case. As shown, however, there is a lower section 1, a pair of intermediate sections 2 and 3 and an upper section 4, these sections being arranged in superposed relation and supported in vertical position on a suitable foundation 5. These column sections should, of course, be made of material which is not deleteriously affected by the liquor or saturant employed, or should be lined with some material having this characteristic.

Referring more particularly to Figures 2 and 7, it will be noted that the upper section 4 is closed off at its upper end by means of a top plate 10, through the center of which passes the section 11 of a shaft axially arranged in the column; this shaft 11 extends through a stuffing box 12. At 13 is shown an inverted U shaped bracket for supporting above the plate 10 a thrust bearing 14 which is designed to take the weight of the shaft and the parts carried thereby, as will later appear and to permit free rotation thereof. As shown best in Figure 7, the shaft section 11 is tubular and above the plate 10 it has inserted therein the lower end of the solid shaft section 15 pinned thereto by a transverse pin 16. This shaft section 15 extends through a ball-bearing 17, and above this ball-bearing it is keyed within a sleeve 18 which carries a plurality of rollers 19 engaging between hardened disks 20 and 21 seated within a counterbored portion 22 of the bearing member 23. A sleeve 25 having an outwardly extending flange 26 terminating in a downwardly extending skirt 27, is fixed to the shaft section 15 above the bearing 14, the skirt 27 enclosing the upper end of this bearing member 23. To this sleeve 25 is fixed any suitable means for rotating the shaft, as shown a belt pulley 30 being used for this purpose. The axial position of the shaft through this thrust bearing may be adjusted by means of a nut 31 threaded on the shaft section 15 above the sleeve 25 and a check-nut 32 positioned thereabove may be used in order to lock the nut 31 in adjusted position.

The shaft section 11 extends through the column section 4 and at its lower end is fixed therein a plug 40 having a threaded lower end 41 by which it may be attached to a shaft section in the upper intermediate section 3, as will later appear. Within the lower portion of the column section 4 is fixed in vertical spaced relation a series of flat imperforated annular baffle plates 45. As shown these baffle plates are strung upon tie-bolts or rods 46, made fast at their lower ends in circular series to an annular angle member 47 riveted or otherwise fixed to the inner face of the column section 4, the baffle plates 45 being spaced along the tie-bolts by means of spacing sleeves 48 placed therebetween. Intermediate each pair of fixed baffles 45 are rotating imperforated baffle plates 50, which are fixed in spaced relation on the shaft 11. It will be noted that the upper rotating baffle plate is positioned considerably below the top plate 10 of the column section, thus leaving a substantially unobstructed chamber above the baffles for a purpose which will later appear. Somewhat above the upper rotating baffle 50, is positioned an inlet pipe 55 provided with a valve 56, and somewhat above this pipe is positioned an outlet pipe 57 provided with a regulating valve 58. It will be noted that the inlet pipe 55 extends well into section 4, so as to discharge against the shaft section 11 in order that the fluid may be deflected thereby and be spread somewhat over the cross sectional area of the upper section 4. The outlet pipe 57 may also extend well within the section 4 as withdrawing solvent from the center of the column aids in producing symmetrical flow of liquids in the column.

Below the section 4 is an intermediate section 3 shown in detail in Figures 3, 5 and 6. Within this section and throughout substantially its entire length are alternate series of fixed baffles 60, and rotating baffles 61. The rotating baffles 61 are carried by a vertical hollow shaft 65 having at its upper end a threaded opening 650 to receive the threaded lower end 41 of the plug 40 carried by the tubular shaft section 11 by which means this section 11 may be firmly attached to the shaft section 65 so that both may rotate together.

The stationary baffles 60 are carried by tie-rods 66, supported at their lower ends in annular angle member 67 fixed to the wall of the section 3, these stationary baffles being spaced apart along the tie-rods by spacing sleeves 68 similar to the spacing sleeves 48 in the upper section 4. It will thus be seen that the mounting of the stationary baffles is the same in the two sections, but in section 3 the series of rotating and stationary baffles extend the whole length of the section, whereas in the upper section 4 they terminate well below its upper end and below the intake pipe 55.

In Figures 5 and 6, is shown in detail the manner of attaching the rotating baffles to the shafts 11 and 65 and their construction. Each of these rotary baffles comprises a substantially flat disk 70 having a downwardly turned outer stiffening margin 71, and a central perforation having an upwardly extending margin 72. This upwardly extending margin 72 is fixed to the outer face of a sleeve 73 through which the shaft section 11 or 65 passes, this sleeve 73 being fixed to the shaft by means of a transverse bolt 74 passing through mating perforations in the shaft and sleeve. Except for the central openings to receive the actuating shaft these baffles are imperforate. For a purpose which will later appear, there are provided radially extending fins 75 and 76 on the upper and lower faces of the disks 70, these fins being preferably arranged in staggered relation on these upper and lower faces. Similarly each of the stationary baffles is provided with radially extending fins 77 and 78 on its upper and lower faces, and its inner edge may be provided with a stiffening flange similar to the flange 71 of the rotary baffles. If desired, both these baffles may be cast from suitable metal with disks, fins and hubs complete.

The lower intermediate section 2 is identical with the section 3, and as above noted, there may be one or more than two such intermediate sections if desired.

The lower column section 1 is shown in detail in Figure 4. This section is somewhat similar to the upper section 4, but contains in its upper portion only a series of stationary annular baffles 80 similar in all respects to the baffles 45 in the upper section, and rotating baffles 81 similar in all respects to the baffles 50 in the upper section. The rotary baffles are fixed to a hollow shaft 82 coupled to the lower end of the shaft section 65 in the adjacent intermediate section 2 by means of a plug 40 fixed in such upper shaft section and having a threaded lower end 41 for engagement within the upper end of the shaft section 82. As shown the stationary baffles terminate substantially half way down in this section while there are two rotary baffles 81 beneath the lowest stationary baffle. As shown, the lower end of the shaft 82 terminates in a bearing socket 85 in which it may be supported during the assembly of the parts, this socket being in the upper end of a hollow post 86 which has a threaded connection at its lower end in a socket 87 fixed to the base 88 of the column section 1. Beneath the lower rotating baffle 81 in the lower section 1, is shown a supply pipe 120 provided with a control valve 121 which pipe extends well into the column section to discharge its contents against the shaft section 82 to be deflected thereby so as to reach substantially the entire cross sectional area of the column. Beneath this inlet pipe is an outlet pipe 122 provided with a valve 123, this pipe extending well inside the column in the same manner as the outlet pipe 57 at the upper end of the column.

The central shaft is made up in sections as shown, in order to facilitate the assembling of the parts and during such assembly the post 86 is adjusted by screwing upwardly in the socket 87 so that its upper end is somewhat above the position which it is to take when the apparatus is in operation. The section 82 with the two lower rotary baffles 81 fixed thereon is then placed in position and the lowest stationary baffle 80 is then inserted. The next rotary baffle is fixed to the shaft 82, and then the next stationary baffle 80 is placed in position, and so on until the rotary and stationary baffles are completely assembled in the lower section. The upper stationary baffle 80 of this section is provided with a shaft bearing 89, supported by radially arranged arms 890 extending inwardly therefrom. The section having been built up in this manner, the next intermediate section 2 is placed in position, the shaft section 65 therein made fast to the shaft section 82 and the series of stationary and movable baffles in this intermediate section are placed alternately in position in the same manner as in the lower section 1. However, for a purpose which will later appear a flow regulating device such as an iris diaphragm is preferably placed toward the ends of the series of fixed and movable plates.

In the embodiment shown, these diaphragms are placed for convenience at the lower and upper ends of the lower and upper intermediate sections 2 and 3. It is not always necessary to use such flow regulating devices but they increase the facility with which the flow of the solvent and liquor may be controlled. As shown best in Figures 8, 9 and 10, each of these diaphragms comprises a series of arc-shaped plates 90, each pivoted adjacent to one end as at 91 to an annular plate 92 placed between the flanged end 93 of the intermediate section and an annular cover plate 94 forming the adjacent end wall of the adjacent end section, which sections as shown, are of larger diameter than the intermediate sections.

Against the opposite faces of each of these plates 90 is positioned an annular plate or ring 95, which is held in position with capability of rotating about its axis by means such as angle members 96 extending inwardly from the wall of the corresponding intermediate section. This ring 95 is provided with a series of inclined slots 97 in which ride pins 98 extending from the plates 90. By rotation of the ring 95 it is evident that the sections 90 will be rocked about their pivots 91 so that their inner ends are caused to approach or recede from the shaft 65, the inner ends of these sections together defining a substantially circular opening through which the shaft passes. In the position shown in Figure 1, the elements 90 are rocked into substantial contact with the shaft 65, so as to close off therewith substantially the entire cross sectional area of the intermediate column section, while in Figure 10 they are rocked about their axes 91 in position to expose a relatively large opening between their inner edges and the shaft 65. In order to rotate the ring 95, it is shown as having fixed thereto a segmental rack 100 with which meshes a gear 101 carried by a shaft 102 which extends through the wall of the column and through a stuffing box 103 and has fixed at its outer end a handwheel 104 by which it may be turned. If desired this shaft 102 may be supported in a bearing 105 fixed to the annular plate 94 of the adjacent column end section.

After the column has been built up in the manner described access may be had to the post 86 through hand holes at 110 and the post screwed downwardly into the socket 87 so that the weight of the shaft and rotating baffles is supported entirely by the roller thrust bearing at the upper end of the column which may run in an oil bath so that free running of the shaft may be insured.

For a more complete understanding of this invention it will be described in connection with the recovery of acetic acid from pyroligneous acid liquor, though it should be understood that neither the method nor the apparatus is limited to the recovery of any particular chemicals. A solvent which is particularly suitable for use in the recovery of acetic acid is ether, which is immiscible with pyroligneous acid liquor and is of less specific gravity. The fresh liquor to be extracted, which has preferably been treated previously to remove therefrom the tar and methanol, is flowed into the upper section 4 of the column through the pipe 55 and is maintained at a level therein between this pipe and outlet pipe 57 hereinbefore referred to by proper adjustment of the valves in these pipes. The position of the level of this liquid may be readily ascertained, for this purpose a gage-glass 140 being shown extending vertically between the levels of these two pipes in the upper column section 4. The upper portion of this column section forms a substantially unobstructed chamber so that there is a pool of considerable volume of acid liquor maintained therein and replenished by untreated acid liquor remote from the restricted passage and from which a portion passes through the restricted passage between the rotating and stationary baffles in a tortuous zigzag course down through the lower portion of the column section 4, the sections 3 and 2, and the upper portion of column section 1. The ether is passed through the pipe 120 into the lower column section 1 beneath the baffles, and since the lower portion of this lower section is substantially unobstructed it forms a pool of considerable volume therein which is replenished remote from the lower end of the restricted passage. From this pool the ether passes upwardly about the alternate stationary and rotating baffles in zigzag course contacting with the downwardly flowing acid liquor. As it is of less specific gravity than the acid liquor, the acid liquor passes downwardly and the ether upwardly until the ether passes above the uppermost baffles in column section 4. It then passes through the relatively large pool of acid liquor which has just been introduced through the pipe 55 and is the most highly concentrated liquor, and the flow of ether up through this pool is relatively slow, so that a relatively small quantity of ether having a considerable quantity of acetic acid in solution taken from the acid liquor with which it has previously been in contact passes through a relatively large volume of highly concentrated liquor so that the acid content of the ether may become as highly concentrated as possible. This ether assumes a position above the level of the pool of acid liquor, as at the dotted line $a$—$a$ of Figure 1, and is drawn off through the pipe 57 and the acid recovered therefrom by subjecting the acid-laden ether to distillation. The acid liquor passing downwardly through the column in contact with the upwardly flowing ether parts with some of its acid to the ether so that as it reaches the lower portion of the column it becomes relatively weak in acid. At the same time the ether which is contacting therewith is progressively freer from acid so that the ether is in condition to remove acid from the acid liquor wherever the two are in contact. When the acid liquor reaches the lower portion of the lower column section 1 below the stationary baffles, it is caused to pass comparatively slowly through a relatively large volume of fresh ether introduced through the pipe 120 and which is maintained in the pool beneath the baffles so that nearly all the then remaining acid is removed therefrom. The liquor passing through this pool collects at the bottom of the column section 1, and is drawn off through the pipe 123, the level of this spent liquor being maintained between the pipes 120 and 122 substantially at the dotted line position b—b. The gage glass 141 at the lower portion of the column section 1 makes possible the determination of the level of the spent liquor which in turn defines the lower limit of the pool of fresh ether through which the nearly spent acid-liquor passes on its way to the outlet pipe 122.

The presence of the baffles insures a restricted passage between the upper pool of fresh liquor in the upper column section 4 and the lower pool of fresh ether in the lower column section, 1, so that the amount of the acid passing downwardly is relatively small in proportion to the amount of ether in the lower pool, and the amount of ether passing upwardly is relatively small in proportion to the pool of fresh liquor in the upper column section 4. By replenishing the pools remote from the restricted passage, treatment by the other fluid of all the fluid thus introduced before it reaches the restricted passage is insured. To further control the rate of flow of the acid-liquor downwardly, and of the ether upwardly, the diaphragms between the upper and lower and the intermediate sections have been provided, and by adjustment of these diaphragms the proportions of ether to acid-liquor in their flow through the baffled section may be adjusted. For example, if the upper diaphragm is closed more than the lower diaphragm, the fluid beneath the upper diaphragm will be largely ether, while if the lower diaphragm is more nearly closed, the fluid above it will be largely acid-liquor.

In order to increase the size of the pools of fresh liquor and fresh ether relative to their rates of flow through each other, the upper and lower column sections have been shown as of larger diameter than the intermediate sections, this to increase their cross-sectional area, although the same result might be attained to a lesser degree if all the sections were of the same diameter. Not only is the passage between the upper and lower pools restricted by the baffles, but the rates and directions of flow of fluids about these baffles is constantly changing; for example, as the fluids pass toward the central shaft, they flow toward the center of the column and due to the fact that the cross sectional area between the baffles is constantly decreasing as the central axis of the column is approached, the rate of flow is increased, since the same quantity of fluid flows throughout, while as the fluids pass by the inner ends of the stationary baffles they immediately flow outwardly toward the periphery of the column in reverse direction to their former flow and at constantly decreasing velocity due to the constantly increasing cross sectional area of their path. The radially extending fins 77 and 78 on the stationary baffles act to prevent the fluid from flowing toward one place on any of the stationary baffles since these fins act as partitions which insure that fluid deposited on one of the pan-like sections formed thereby must flow off the inner end of the same section, while the radiating fins on the rotating sections cause the fluid received from each pan section of the stationary baffles to be moved circumferentially by the rotation so as to be brought into contact with pan-shaped receptacles of adjacent stationary baffles angularly disposed from those from which the fluid was received by the rotary baffles. The rotary baffles in the chambers at the ends of the columns beyond the stationary baffles act as stirrers to effect an intimate mixture of the liquor and solvents in the pools. These baffles might, therefore, be formed with perforations over their surfaces distributed so as to distribute the fluid emerging from the restricted passage evenly over the cross sectional area of the pool or alternate pen sections between adjacent fins may be cut away, the cut away portions of adjacent end rotary baffles being staggered. This construction helps to mix the fluids gently so as not to disturb their gravity separations in the pools.

There is thus an intimate mixture effected between the solvent and the chemically laden liquor not only due to the changes in velocity and direction of flow, but also to the prevention of flow currents substantially axially of the column because of the presence of the fins on the baffles which insure circulation of the two fluids spirally within the column, though the tie rods 46 and 66 offer obstruction to free circular flows, thus aiding in mixing the fluids.

It will thus be seen that the conditions for most efficient extraction comprising the treatment of nearly spent acid liquor with a relatively large volume of fresh solvent has been insured in this apparatus, and also that the conditions for the most efficient extraction of the chemicals from the solvent by reason of the treatment of a relatively small quantity of chemically laden solvent with a relatively large quantity of fresh chemical containing liquor has been effected, so that the spent liquor contains the minimum amount of unrecovered chemicals which pass to waste and the solvent is the most nearly saturated with chemicals that can be produced by the liquor of the degree of concentration treated by the apparatus. The levels of the liquor and solvent in the upper and lower sections of the column may be kept at the proper point by manipulation of the valves in the supply and outlet pipes therefor, as well as by manipulation of the diaphragms by means of the hand wheels 104, and the speed of rotation of the rotary baffles may be adjusted to that point which is found most suitable for the particular fluids being treated. Where there is danger of emulsification of the liquids of course the rotary baffles should be rotated at such low speed that the emulsification does not take place. It has been found in practice that there appears to be no danger of emulsification occurring in the case of pyroligneous acid liquor and ether.

The method which the apparatus hereinbefore described has been particularly designed to carry out is not claimed herein but forms subject matter divided from this application and claimed in my application for Patent Serial No. 175,734, filed March 16, 1927, for Method of extraction.

From the foregoing description of an embodiment of this invention it should be evident to those skilled in the art that various changes and modifications might be made without departing from the spirit or scope of this invention as defined by the appended claims.

I claim:

1. An apparatus of the class described comprising an upright column having a restricted passage and relatively large chambers at opposite ends of said passage, means for introducing fluids into said chambers from without the column at points remote only from said restricted passage to form pools in said chambers replenished remote from said restricted passage and from each of which fluid may flow through said restricted passage in countercurrent flow to fluid from the said other pool and then through said other pool, and means nearer the ends of said column than said introducing means for withdrawing fluids passed through the respective adjacent pools.

2. An apparatus of the class described comprising an upright column having a restricted passage above a relatively large chamber in the lower end of said column, means remote only from said restricted passage for introducing fluid into said chamber from without the column to form a pool therein of substantial volume beneath said restricted passage and from the upper end of which pool said fluid may pass upwardly through said passage, means for removing such fluid from above said passage, means separate from and below said removing means for introducing fluid into said column above said restricted passage to pass downwardly through the said passage in countercurrent flow to the fluid introduced into said pool, and means below said means for introducing fluid into said pool for withdrawing fluid passed downwardly through said pool from above said restricted passage.

3. An apparatus of the class described comprising a column, a series of baffles intermediate the length of said column and defining a restricted passage between opposite end portions thereof, means for introducing fluids into said end portions, means nearer the ends of said column than said introducing means for withdrawing fluids from said column, and means in said passage for further restricting the flow of fluids therethrough to an adjustable extent.

4. An apparatus of the class described comprising a column having a restricted passage between opposite end portions thereof, means for introducing fluids into said end portions, means nearer the ends of said column than said introducing means for withdrawing fluids from said column, and means in said passage for further restricting the flow of fluids therethrough to an adjustable extent.

5. An apparatus of the class described comprising a column, a shaft extending axially of said column, a series of annular baffles fixed in said column and spaced from said shaft, said series terminating inwardly of the ends of said column to define substantially unobstructed chambers at its ends, rotary baffles fixed to said shaft between said stationary baffles and extending toward the wall of said column, means for rotating said shaft and rotary baffles and means for introducing and withdrawing fluids at different levels in said chambers.

6. An apparatus of the class described comprising a column, a shaft extending axially of said column, a series of annular baffles fixed in said column and spaced from said shaft, said series terminating inwardly of the ends of said column to define substantially unobstructed chambers at said ends, rotary baffles fixed to said shaft between said stationary baffles and extending toward the wall of said column, and means for introducing and withdrawing fluids at different levels in said chambers, said baffles having substantially radially arranged fins thereon.

7. An apparatus of the class described comprising a column, a series of baffles arranged in the central portion of said column to form a restricted passage between relatively large chambers at the end portions of said column, and means for further restricting said passage adjacent to opposite ends thereof.

8. An apparatus of the class described comprising a column, a series of baffles arranged in the central portion of said column to form a restricted passage between relatively large chambers at the end portions of said column, and a diaphragm having an opening adjustable in size adjacent to each end of said passage.

9. An apparatus of the class described comprising a column, a series of stationary and movable baffles intermediate the ends of said column defining a restricted passage between relatively unobstructed chambers at opposite ends thereof, means for moving said movable baffles, separate fluid supply and removing means for each of said chambers, and means for agitating the fluids in said chambers.

10. An apparatus of the class described comprising a column, a series of stationary and rotatable baffles intermediate the ends of said column defining a restricted passage, said baffles having substantially radial fins thereon for restricting the flow of fluid circumferentially, and separate means for supplying and drawing off fluids at opposite ends of said passage.

11. An apparatus of the class described comprising a column, a series of stationary and rotatable baffles intermediate the ends of said column defining a restricted passage, means for rotating said rotary baffles, said baffles having means thereon for restricting the flow of fluid in certain directions, and separate means for supplying and drawing off fluids at each of opposite ends of said passage.

12. An apparatus of the class described comprising a column of circular cross section, a series of stationary spaced imperforate annular baffles extending inwardly from the wall of said column, a rotary shaft extending axially of said column, a series of flat imperforate circular baffles spaced along and fixed to said shaft and alternating with said stationary baffles axially of said column and terminating inwardly of the wall thereof and means for introducing and removing fluids from said column beyond both ends of said series of baffles and at different distances therefrom.

13. An apparatus of the class described comprising a column of circular cross section, a series of spaced imperforate annular baffles extending inwardly from the wall of said column, a shaft extending axially of said column, and a series of flat imperforate circular baffles spaced along said shaft and alternating with said stationary baffles axially of said column and terminating inwardly of the wall thereof, said baffles having substantially radially extending fins thereon.

14. An apparatus of the class described comprising an upright column formed in longitudinal sections, each of certain of said sections having a lengthwise series of stationary spaced baffles extending inwardly from the wall thereof, rotary shaft sections arranged axially in said column sections, certain of said shaft sections having baffles fixed thereto in longitudinal series alternating with said stationary baffles and defining therewith a tortuous restricted passage lengthwise of said column section, means for coupling said shaft sections together in axial alinement for simultaneous rotation when said column sections are assembled, a bearing for suspending said shaft sections and the baffles carried thereby from the upper portion of said column, and means for adjusting said shaft sections axially relative to said bearing.

15. An apparatus of the class described comprising a vertical column, a series of stationary horizontal baffles in said column, a vertical shaft extending axially of said column, a series of baffles fixed to said shaft and defining with said stationary baffles a tortuous restricted passage, a bearing for the upper end of said shaft above the top of said column for supporting the weight of said shaft and the baffles carried thereby, means for rotating said shaft, and separate means for supplying to and withdrawing fluids from said column above and below said series of baffles.

16. An apparatus of the class described comprising a vertical column, a series of stationary horizontal baffles in said column, a vertical shaft extending axially of said column, a series of baffles fixed to said shaft and defining with said stationary baffles a tortuous restricted passage, a bearing for the upper end of said shaft above the top of said column for supporting the weight of said shaft and the baffles carried thereby, means for rotating said shaft, means for supplying to and withdrawing fluids from said column, and an adjustable step bearing for the lower end of said shaft.

17. An apparatus of the class described comprising a column, a shaft extending axially of said column, a series of annular baffles fixed in said column and spaced from said shaft, said series terminating inwardly of the ends of the said column to define substantially unobstructed chambers at its ends, baffles fixed to said shaft between said stationary baffles and extending toward the wall of said column, a shaft bearing at the upper end of said shaft for supporting the weight of said shaft and the baffles fixed thereto, means for rotating said shaft, and means for introducing and withdrawing fluids at different levels in both of said chambers.

In testimony whereof I have affixed my signature.

JESSE M. COAHRAN.